US007224503B2

(12) United States Patent
Takayama

(10) Patent No.: US 7,224,503 B2
(45) Date of Patent: May 29, 2007

(54) OPTICAL SCANNING APPARATUS AND IMAGE FORMING APPARATUS USING THE SAME

(75) Inventor: Hidemi Takayama, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/263,910

(22) Filed: Nov. 2, 2005

(65) Prior Publication Data

US 2006/0055995 A1 Mar. 16, 2006

Related U.S. Application Data

(62) Division of application No. 10/887,850, filed on Jul. 12, 2004, now Pat. No. 7,031,039.

(30) Foreign Application Priority Data

Jul. 30, 2003 (JP) ............................ 2003-203826

(51) Int. Cl.
*G02B 26/08* (2006.01)
*B41J 2/47* (2006.01)

(52) U.S. Cl. ...................... 359/204; 359/207; 359/205; 347/232; 347/243; 347/244

(58) Field of Classification Search ..................... None
See application file for complete search history.

(56) References Cited

U.S. PATENT DOCUMENTS 6,459,520 B1 10/2002 Takayama ................... 359/204
6,501,586 B1 12/2002 Takayama ................... 359/206
6,504,558 B1 1/2003 Takayama ................... 347/132
6,519,070 B2 2/2003 Takayama ................... 359/205
6,717,704 B2 4/2004 Nakai ......................... 359/204
6,856,439 B2 2/2005 Inagaki ....................... 359/204
7,031,039 B2 * 4/2006 Takayama ................... 359/204
2004/0156084 A1 8/2004 Takayama ................... 359/196

FOREIGN PATENT DOCUMENTS

JP 1-281468 11/1989

* cited by examiner

*Primary Examiner*—James Phan
(74) *Attorney, Agent, or Firm*—Fitzpatrick, Cella, Harper & Scinto

(57) ABSTRACT

Disclosed is an optical scanning apparatus for repeatedly optically scanning a plurality of surfaces to be scanned, including: a plurality of light sources; an optical deflector for deflecting and reflecting a plurality of light beams emitted from the plurality of light sources; and at least one scanning optical system for guiding the plurality of light beams which are deflected and reflected by the optical deflector to the different surfaces to be scanned. In the optical scanning apparatus, the plurality of light beams incident on the optical deflector are incident on a deflection surface of the optical deflector at different angles to a normal of the deflection surface, the scanning optical system is commonly used for the plurality of light beams, and the scanning optical system includes a first optical element that satisfies $0 \leqq |\phi 1s| < 0.001$ where $\phi 1s$ represents optical power of the scanning optical system within a sub scanning section.

5 Claims, 10 Drawing Sheets

OPTICAL SCANNING APPARATUS AND IMAGE FORMING APPARATUS USING THE SAME

This application is a division of application Ser. No. 10/887,850, filed Jul. 12, 2004, now U.S. Pat. No. 7,031,039, the contents of which are incorporated herein by reference.

This application claims priority from Japanese Patent Application No. 2003-203826 filed on Jul. 30, 2003, which is hereby incorporated by reference.

BACKGROUND OF THE INVENTION

1. Field of the Invention

The present invention relates to an optical scanning apparatus and an image forming apparatus using the same. In particular, the optical scanning apparatus is suitable for an image forming apparatus in which a polygon mirror as an optical deflector reflects and deflects a light beam emitted from a light source, and image information is recorded by optical scanning on a surface to be scanned with a light beam through a scanning optical system, such as a laser beam printer (LBP), a digital copying machine, or a multi-function printer, which employs, for example, an electrophotographic process.

2. Related Background Art

Conventionally, in an image forming apparatus such as a laser beam printer or a digital copying machine, a light beam which is optically modulated according to an image signal by a light source composed of, for example, a semiconductor laser and emitted therefrom is periodically deflected by an optical deflector composed of, for example, a rotating polygonal mirror (polygon mirror). The deflected light beam is converged in a spot shape onto the surface of a photosensitive recording medium (photosensitive drum) by a scanning optical system (scanning lens system) having an fθ characteristic. The surface of the recording medium is optically scanned with the light beam to perform image recording.

FIG. 15 is a main part sectional view of an optical scanning apparatus used for such a conventional image forming apparatus in a main scanning direction (main scanning sectional view).

In FIG. 15, a parallel light beam emitted from a laser unit 91 including a semiconductor laser is incident on a cylindrical lens (condensing lens) 92 having predetermined optical power only in a sub scanning direction. The parallel light beam which is incident on the cylindrical lens 92 exits therefrom without changing a parallel light beam state within a main scanning section.

On the other hand, the parallel light beam is condensed within a sub scanning section and imaged as a linear image extended in the main scanning direction near a deflection surface 93*a* of an optical deflector 93 composed of a rotating polygonal mirror. The light beam which is reflected and deflected on the deflection surface 93*a* of the optical deflector 93 is imaged as a light spot onto the surface of a photosensitive drum 95 serving as a surface to be scanned through a scanning optical system (fθ lens system) 94 having an fθ characteristic. The surface of the photosensitive drum 95 is repeatedly scanned with the light spot. The scanning optical system 94 is composed of a spherical lens 94*a* and a toric lens 94*b*.

In the optical scanning apparatus, a beam detector (BD) sensor 98 serving as an optical detector is provided to adjust a timing of starting an image formation on the surface of the photosensitive drum 95 before the surface of the photosensitive drum 95 is scanned with the light spot. The BD sensor 98 receives a BD light beam which is a part of the light beam which is reflected and deflected on the optical deflector 93, that is, a light beam with which a region other than an image forming region on the surface of the photosensitive drum 95 is being scanned before the image forming region is scanned. The BD light beam is reflected on a BD mirror 96, condensed by a BD lens (condensing lens) 97, and incident on the BD sensor 98. A BD signal (synchronous signal) is detected from an output signal of the BD sensor 98 and a timing to start image recording on the surface of the photosensitive drum 95 is adjusted based on the BD signal.

The photosensitive drum 95 rotates at constant speed in synchronization with a drive signal of the semiconductor laser in the laser unit 91 and the surface of the photosensitive drum 95 is moved in the sub scanning direction with respect to the light spot for scanning.

Thus, an electrostatic latent image is formed on the photosensitive drum 95. The electrostatic latent image is developed by a known electrophotographic process and transferred to a transfer material, such as a paper to obtain a visualized image.

According to a multi-image forming apparatus using a scanning optical system, images having different colors are generally formed by a plurality of image forming portions. Paper is transferred by a conveying member such as a conveyor belt. The plurality of images are superimposed on the paper to perform the image formation. In particular, even if a slight superimposition displacement occurs in a multicolor development, an obtained full color image deteriorates. For example, even if a superimposition displacement of a fraction of one pixel, 63.5 μm, occurs in the case of 400 dpi, it appears as a color misregistration, thereby significantly deteriorating the image.

To cope with it, the color development has been conventionally performed by the use of the same scanning optical system. That is, optical scanning has been performed with the same optical characteristic to reduce an image displacement. However, this method has contained a problem that it takes time to output a multi-image or a full color image. In order to solve the problem, there is a method of forming images by the use of separate optical scanning apparatus to obtain respective color images and then superimposing the images on a paper transferred by a conveying portion.

In such a method, there may be a concern over a color misregistration when the images are superimposed. It is an effective method against the color drift to detect the positions of the images and to control an image forming portion so as to correct the images based on the detection signals (For example, see Japanese Patent Publication No. H01-281468).

In an image forming apparatus in which a plurality of photosensitive members are scanned with a beam, the scanning optical systems as many as the photosensitive members are generally used to form latent images on the plurality of the photosensitive members. In the image forming apparatus, since there needs optical parts as many as the scanning optical systems, and in particular, the optical deflector (polygon mirror) is expensive, there is a problem that a cost of the image forming apparatus may rise. In the case of a high resolution scanning optical system operated at high speed, since the optical deflector becomes larger in size, the optical deflector is required to have the ability of deflecting light at high speed. Therefore, the problem is serious.

In order to overcome the problem, an optical scanning apparatus in which a plurality of beams are deflected by a common optical deflector has been proposed. In an optical scanning apparatus in which a photosensitive member in the sub scanning direction is scanned by a common optical deflector, it is necessary to provide a mechanism for shifting a beam drawing position in the sub scanning direction in order to improve the precision of superimposition of the images in the sub scanning direction. In the method, the superimposition has been adjusted by the shift of the drawing position line by line in the sub scanning direction, by selecting the deflection surface of the optical deflector with which the drawing of a beam in the sub scanning direction starts.

Since a compact, low-cost, and high-quality full color image forming apparatus has been required recently, a system of scanning a plurality of beams using a single common polygon mirror has been proposed as a method that satisfies the requirement to reduce the number of parts, thereby lowering a cost of the image forming apparatus.

When the common polygon mirror is used so as to guide the plurality of beams to different surfaces to be scanned respectively, it is necessary to separate optical paths. Therefore, the beams need to be apart from each other in the sub scanning direction. As a result, there is a problem that the polygon mirror becomes larger in thickness to increase a cost of the image forming apparatus.

Even when a first optical element (scanning lens) of the scanning optical system is commonly used to lower the cost of the image forming apparatus, light beam transmitting positions of the lens are apart from one another in the sub scanning direction, so that a height of the lens in the sub scanning direction is increased. As a result, there is a problem that a cost reduction effect is small.

SUMMARY OF THE INVENTION

An object of the present invention is to provide a simple and compact optical scanning apparatus in which an optical deflector is thinned, a scanning line curvature on a surface to be scanned is suppressed, and preferable optical performance is obtained, and an image forming apparatus using the optical scanning apparatus.

According to one aspect of the invention, an optical scanning apparatus for scanning a plurality of surfaces to be scanned, includes:

a plurality of light sources;

an optical deflector for deflecting and reflecting a plurality of light beams emitted from the plurality of light sources; and a scanning optical system for guiding the plurality of light beams which are deflected and reflected by the optical deflector to the different surfaces to be scanned, and in the optical scanning apparatus, the plurality of light beams incident on the optical deflector are incident on a deflection surface of the optical deflector at different angles to a normal of the deflection surface within a sub scanning section, the scanning optical system includes a first optical element and a second optical element, the first optical element is commonly used for the plurality of light beams, and the first optical element satisfies $0 \leqq |\phi \mathbf{1} s| < 0.001$ where $\phi\mathbf{1}s$ represents optical power of the scanning optical system within the sub scanning section.

According to further aspect of the invention, in the optical scanning apparatus, the scanning optical system further includes a second optical element which is provided for each of the plurality of light beams and has optical power in a sub scanning direction, and provided that optical power of the first optical element and optical power of the second optical element within a main scanning section are represented by $\phi\mathbf{1}$m and $\phi\mathbf{2}$m, respectively, $$|\phi 1m/\phi 2m| > 2.0$$

is satisfied.

According to further aspect of the invention, in the optical scanning apparatus, the scanning optical system further includes a second optical element which is provided for each of the plurality of light beams and has optical power in a sub scanning direction, and provided that optical power of the first optical element and optical power of the second optical element within the sub scanning section are represented by $\phi\mathbf{1}$s and $\phi\mathbf{2}$s, respectively, $$|\phi 1s/\phi 2s| < 0.1$$

is satisfied.

According to further aspect of the invention, in the optical scanning apparatus, the first optical element has a plane where radius of curvature of a light incident surface and radius of curvature of a light exit surface in the sub scanning direction are equal to each other, and the first optical element has optical power in a main scanning direction and includes at least one aspherical plane in a main scanning section.

According to further aspect of the invention, in the optical scanning apparatus, the second optical element has a shape in which at least one of a light incident surface and a light exit surface has no inflection point within a main scanning section, and optical power off a scanning axis is lower than optical power on the scanning axis within the sub scanning section.

According to further aspect of the invention, in the optical scanning apparatus, the second optical element has a shape in which at least one of a light incident surface and a light exit surface is spherical within a main scanning section, and optical power off the scanning axis is lower than optical power on the scanning axis within the sub scanning section.

According to further aspect of the invention, in the optical scanning apparatus, an optical axis of the second optical element within the sub scanning section is eccentric to a deflection and reflection point side with respect to a Principal Ray position of a light beam incident on the second optical element within the sub scanning section.

According to further aspect of the invention, in the optical scanning apparatus, the scanning optical system has a constant magnification in the sub scanning direction within an effective image region.

According to further aspect of the invention, in the optical scanning apparatus, a magnification of the scanning optical system within the sub scanning section is 1.3-fold magnification or less, and the plurality of light beams are divided after transmitted through the first optical element and each of the divided light beams is incident on a second optical element provided for each of the light beams.

According to further aspect of the invention, in the optical scanning apparatus, the scanning optical systems are disposed so as to sandwich the optical deflector.

According to further aspect of the invention, the optical scanning apparatus further includes: an optical member which is movavle and/or deformable on an optical path; and an adjustment member for adjusting a curvature of a scanning line on the surface to be scanned.

According to further aspect of the invention, in the optical scanning apparatus, an optical axis of the second optical element within the sub scanning section is eccentric in parallel to a deflection and reflection point side with respect to a Principal Ray position of a light beam incident on the second optical element within the sub scanning section, and a Principal Ray of a light beam is incident on the second optical element at an angle to an optical axis of the second optical element within the sub scanning section.

According to another aspect of the invention, an image forming apparatus includes: a plurality of image bearing members in which different color images from one another are formed, each of which is disposed on a surface to be scanned in the foregoing optical scanning apparatus.

According to further aspect of the invention, the image forming apparatus further includes a printer controller that converts a color signal inputted from an external apparatus into image data in different colors and outputs the image data to each of the optical scanning apparatus.

DETAILED DESCRIPTION OF THE PREFERRED EMBODIMENTS

Embodiment 1

Figure 1:
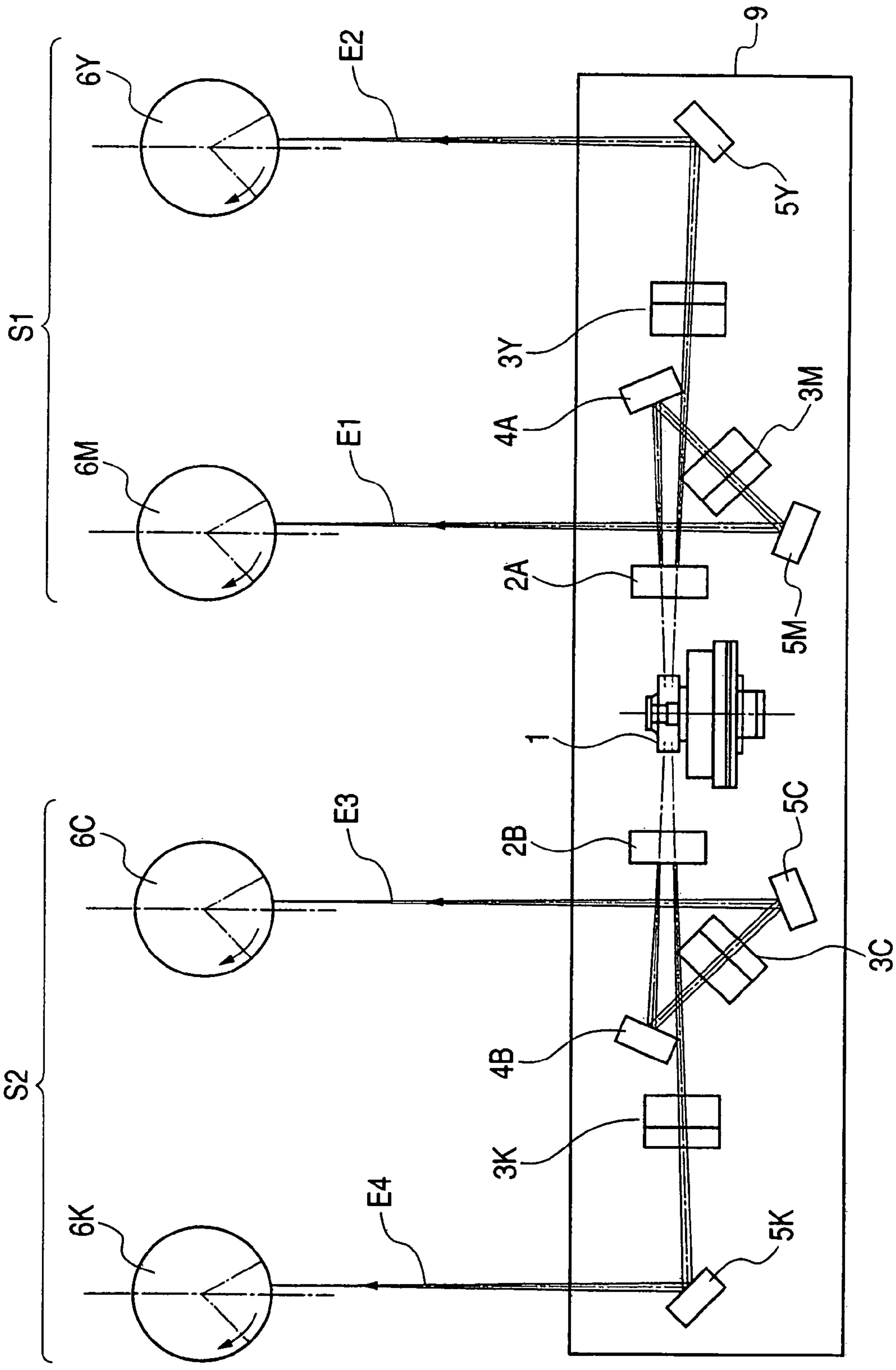
FIG. 1 is a sub scanning sectional view showing an optical scanning apparatus according to embodiment 1 of the present invention.

FIG. 1 is a main part sectional view (sub scanning sectional view) showing an optical scanning apparatus (image forming apparatus) in a sub scanning direction according to Embodiment 1 of the present invention.

Here, a main scanning direction indicates a direction perpendicular to the rotational axis of an optical deflector and the optical axis of a scanning optical system (direction in which a light beam is reflected and deflected (is deflected with scanning) by the optical deflector). The sub scanning direction indicates a direction parallel to the rotational axis of the optical deflector. A main scanning section indicates a plane which is parallel to the main scanning direction and includes the optical axis of the scanning optical system. A sub scanning section indicates a section perpendicular to the main scanning section.

In this embodiment, a plurality of light beams which are emitted from a light source and modulated according to an image signal are divided into two scanning groups (scanning optical systems) S1 and S2. The two scanning groups S1 and S2 are symmetrical about an optical deflector (polygon mirror) 1 and the optical operations of the scanning groups S1 and S2 are identical to each other. Therefore, hereinafter, the scanning group S1 on the right hand side as seen in FIG. 1 will be described.

In FIG. 1, in each of photosensitive drums 6M and 6Y, a photosensitive layer is applied on a conductor. A latent image is formed by a light beam emitted from a scanning optical portion contained in an optical box 9.

The optical deflector 1 is composed of, for example, a polygon mirror (rotating polygonal mirror) and rotated at constant speed by a drive means such as a motor (not shown).

In this embodiment, when respective elements and respective light beams are projected to the sub scanning section, two light beams are obliquely incident at different incident angles with respect to the normal of a deflection surface of the polygon mirror 1 (oblique incident scanning optical system).

Absolute values of incident angles θ on the deflection surface of the polygon mirror 1 are equal to each other and signs thereof are different from each other. However, angles θ1 and θ2 can have different absolute values (such as $|\theta 1| \neq |\theta 2|$).

In this embodiment, the two light beams are incident on the same deflection surface of the polygon mirror 1. However, three or more light beams may be incident on the same deflection surface of the polygon mirror 1.

A first scanning lens 2A serving as a first optical element has no optical power within the sub scanning section and has optical power within the main scanning section. The first scanning lens 2A has a light incident surface and a light exit surface where a curvature radius of a light incident surface is equal to that of a light exit surface within the sub scanning section. The first scanning lens 2A includes at least one aspherical plane within the main scanning section. The first scanning lens 2A is used to image an incident light beam mainly in the main scanning direction and to perform uniform scanning speed (fθ characteristic).

In this embodiment, scanning lenses are used as second optical elements 3M and 3Y. However, the second optical elements 3M and 3Y may be replaced by diffraction elements or curved mirrors. In this embodiment, as described below, each of the second optical elements is composed of a single scanning lens. However, each second element may be composed of two or more scanning lenses.

In this embodiment, a scanning lens is used as the first optical element 2A. However, the first optical element 2A may be replaced by a diffraction element or a curved mirror.

Each of the second scanning lenses 3M and 3Y serving as the second optical elements has a light incident surface which is spherical within the main scanning section and a light exit surface which does not include a inflection point within the main scanning section. Each second optical element is made of a plastic material having weaker optical power off a scanning axis than that on the scanning axis within the sub scanning section.

The second scanning lenses serving as the second optical elements may be diffraction elements or curved mirrors.

The optical axis of each of the second scanning lenses 3M and 3Y within the sub scanning section is eccentric from a main light beam position of a light beam incident on the second scanning lenses 3M and 3Y within the sub scanning section. The second scanning lenses 3M and 3Y each are set so as to keep magnifications on the scanning axis and the off-axis substantially constant within the sub scanning section. The second scanning lenses 3M and 3Y are used to correct a curvature of field with respect to an incident light beam mainly in the sub scanning direction.

In this embodiment, the first scanning lens 2A and the second scanning lens 3M constitute a first scanning lens system. The first scanning lens 2A and the second scanning lens 3Y constitute a second scanning lens system. The first and the second scanning lens systems constitute the scanning optical system. In this embodiment, an imaging magnification of the scanning optical system within the sub scanning section is set to 1.3 or less.

The first and the second scanning lens systems image light beams E1 and E2 based on image information, which are each reflected and deflected by the polygon mirror 1, onto surfaces of the photosensitive drums 6M and 6Y serving as the surfaces to be scanned, respectively. In addition, the first and the second scanning lens systems each have a tangle error correction function attained by bringing the deflection surface of the polygon mirror 1 and the surface of each of the photosensitive drums 6M and 6Y into a conjugate relationship within the sub scanning section.

A first return mirror 4A and a second return mirror 5M (optical members) are provided on an optical path of the light beam E1 and reflect the light beam in predetermined directions. A third return mirror (optical members) 5Y is provided on an optical path of the light beam E2 and reflects the light beam in a predetermined direction.

As described later, the first, second, and third return mirrors are movable and/or deformable and used to adjust a curvature of a scanning line on the surface to be scanned by an adjustment member.

In this embodiment, when all elements and all light beams are projected to the sub scanning sectional view, the two light beams E1 and E2 are separately deflected by the polygon mirror 1 along the separate optical paths respectively, then the incident light beam E1 is reflected by the first return mirror 4A toward the opposite side to the photosensitive drums 6M and 6Y. The optical box 9 contains all parts of the scanning optical portion.

In this embodiment, the scanning optical portion is located below the photosensitive drums in FIG. 1. In the scanning optical portion, two light beams are made incident on either side of the single polygon mirror 1, and light beams E1 to E4 are guided onto the surfaces of the corresponding photosensitive drums, thereby printing a color image at high speed.

As described above, the scanning optical system in this embodiment is an oblique incident scanning optical system for oblique incidence within the sub scanning section. The oblique incident scanning optical system is an optical system in which light beams are obliquely incident on the surface perpendicular to the rotational axis of the polygon mirror 1 (main scanning section) within the sub scanning section (plane parallel to the plane of FIG. 1). Since the light beams are obliquely incident, it is possible to narrow a width of the deflection and reflection surface of the polygon mirror 1 in the sub scanning direction. Likewise, because the positions of the light beams in the sub scanning direction are close to each other, the width of the first scanning lens 2A in the sub scanning direction can be narrowed.

Next, an optical operation in this embodiment will be described.

In this embodiment, the two light beams E1 and E2 incident on the deflection surface of the polygon mirror 1 from two incident optical systems described later are reflected at an angle ±θ with respect to the normal to the main scanning section to perform deflection scanning. After that, the two light beams E1 and E2 are incident on the separate positions on the surface of the common first scanning lens 2A. After the two light beams E1 and E2 transmitting through the first scanning lens 2A, the light beam E1 reflected on the first return lens 4A transmits through the second scanning lens 3M and then is reflected on the second return mirror 5M upwardly in FIG. 1. The reflected light beam E1 intersects the optical path of its own in a space. As the light beam E1 is returned on the first return mirror 4A and on the second return mirror 5M, the light beam E1 intersects the optical path of the other light beam E2 twice and reaches the photosensitive drum 6M.

On the other hand, the light beam E2 transmitting through the first scanning lens 2A passes beside the first return lens 4A, so that the optical path of the light beam E2 is separated from the optical path of the light beam E1. After that, the light beam E2 transmits through the second scanning lens 3Y, is reflected on the third return mirror 5Y upwardly in FIG. 1 and reaches the photosensitive drum 6Y.

Electrical latent images are formed with the light beams traveling toward the photosensitive drums 6M and 6Y. A multicolor image is formed on a paper by an electrophotographic process including development, transfer, and fixing, which is not shown.

The first scanning lens 2A in this embodiment is commonly used for the two light beams E1 and E2. The second scanning lens 3M and 3Y are used for the light beam E1 and E2 respectively.

Figure 2:
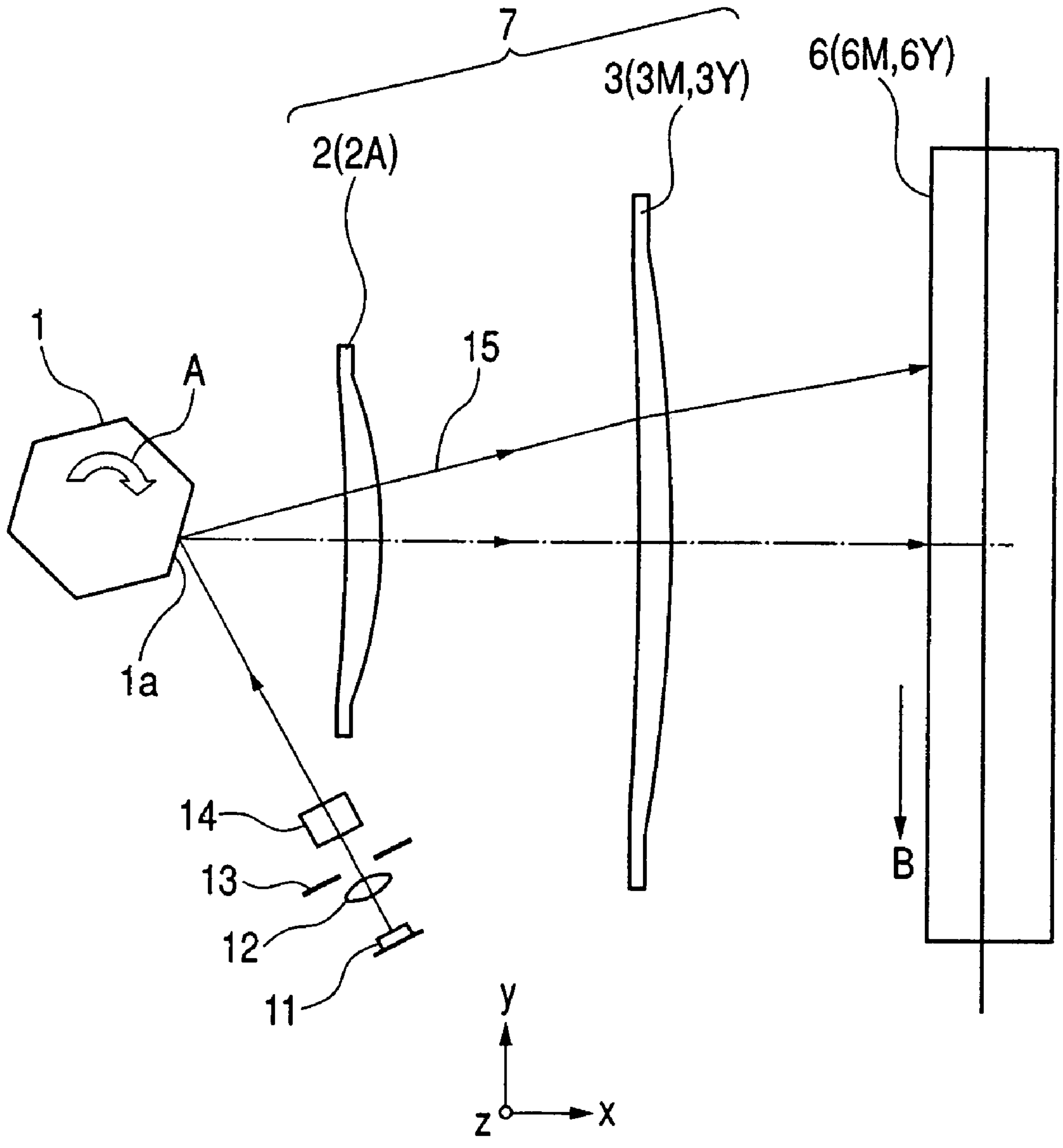
FIG. 2 is a main scanning sectional view showing a scanning optical system according to embodiment 1 of the present invention.
Figure 3A:
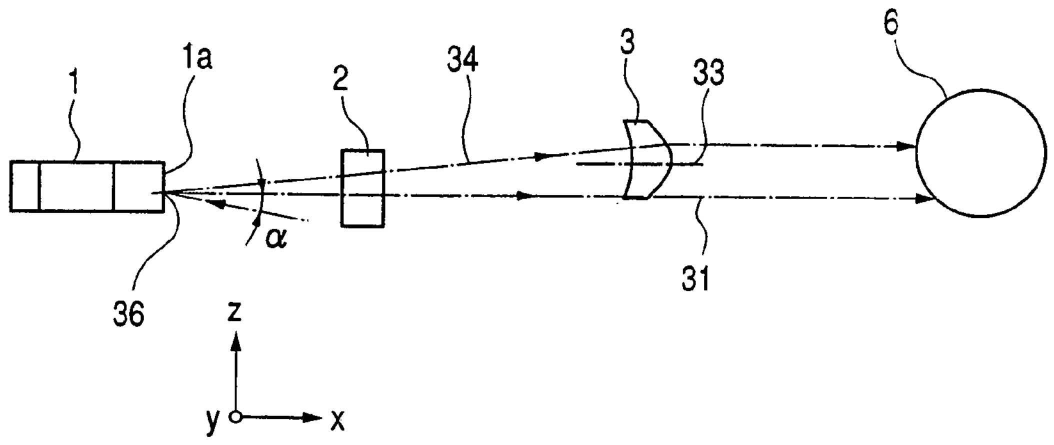
FIGS. 3A and 3B are sub scanning sectional views showing the scanning optical system according to embodiment 1 of the present invention.

FIG. 2 is a main part sectional view (main scanning sectional view) showing the scanning group (scanning optical system) S1 shown in FIG. 1 in the main scanning direction. FIG. 3A is a main part sectional view (sub scanning sectional view) showing the scanning group S1 shown in FIG. 2 in the sub scanning direction. In FIGS. 2 and 3A, the same symbols denote the same elements as those in FIG. 1. Note that the return mirrors are omitted here.

In addition, FIG. 3A shows only a magenta station (M) of FIG. 1, in which a yellow station (Y) is omitted. Note that the yellow station is an optical system having a linear symmetrical arrangement about a normal 31 of the deflection and reflection surface.

In FIG. 2, a plurality of light sources 11 for emitting light beams modulated according to an image signal are composed of, for example, semiconductor lasers. In this embodiment, the plurality of light sources are used. However, the present invention is not limited to this. For example, a light source having a plurality of light-emitting portions may be used. A conversion optical element 12 (for example, a collimator lens) converts the light beams emitted from the plurality of light sources 11 into substantially parallel light beams (or into substantially divergent light beams or substantially convergent light beams). An aperture stop 13 limits the plurality of transmitting light beams to shape them. A cylindrical lens 14 serving as a condensing lens has predetermined optical power only in the sub scanning direction. With the cylindrical lens 14, the plurality of light beams transmitting through the aperture stop 13 are temporarily formed as a substantially linear image on the vicinity of a deflection surface 1*a* of the polygon mirror 1 (described later) within the sub scanning section. Note that elements such as the collimator lens 12, the aperture stop 13, and the cylindrical lens 14 constitute the incident optical system.

A scanning lens system 7 is composed of the first scanning lens 2 (2A) and the second scanning lens 3 (3M, 3Y), which have the above-mentioned configurations. The scanning lens system 7 images the plurality of light beams based on image information, which are reflected and deflected by the polygon mirror 1, onto different photosensitive drum 6 surfaces (6M, 6Y) serving as the surfaces to be scanned. In addition, the scanning lens system 7 has a tangle error correction function attained by bringing the deflection surface 1*a* of the polygon mirror 1 and the surface of the photosensitive drum 6 into a conjugate relationship within the sub scanning section.

Reference numeral 6 (6M, 6Y) denotes the surface of the photosensitive drum serving as the surface to be scanned and reference numeral 15 denotes a light beam deflected with scanning by the polygon mirror 1.

In FIG. 3A, reference numeral 31 denotes the normal of the deflection surface 1*a* at a deflection and reflection point 36. An optical axis 33 of the second scanning lens 3 is eccentric to the deflection and reflection point 36 side of the deflection surface 1*a* with respect to a light beam transmitting position 34. The light beam transmitting position 34 corresponds to a main light beam of the light beam. The optical axis 33 is parallel to the normal 33 of the deflection surface 1*a*.

In this embodiment, the plurality of light beams from the cylindrical lens 14 are incident on the deflection surface 1*a* at an angle α with respect to the normal 33 thereof within the sub scanning section. Therefore, an image of a scanning beam is incident on the second scanning lens 3 in a curved state, so that a curvature of the scanning line is likely to be also on the surface of the photosensitive drum. In order to prevent the scanning line from curving, the imaging magnification of the scanning optical system 7 within the sub scanning section is set to 1.3 or less. That is, the effect of a change in height in a sagittal optical axis of the second scanning lens, which occurs according to a position in the main scanning direction and is a main factor for causing the curvature of the scanning line in manufacturing of the scanning optical system, is reduced. Disposing the second scanning lens 3 eccentric (eccentric in parallel or rotationally eccentric) so that the imaging magnification within the sub scanning section is 1.3 or less, spot rotation and the curvature of the scanning line on the photosensitive drum are easily eliminated.

That is, in this embodiment, the optical axis 33 of the second scanning lens 3 is disposed eccentric to the deflection and reflection point 36 side of the deflection surface 1*a* with respect to the light beam transmitting position (main light beam position) 34. Simultaneously, the main light beam 34 of the light beam is made enter the second scanning lens 3 at an angle with respect to the optical axis 33 within the sub scanning section.

Figure 3B:
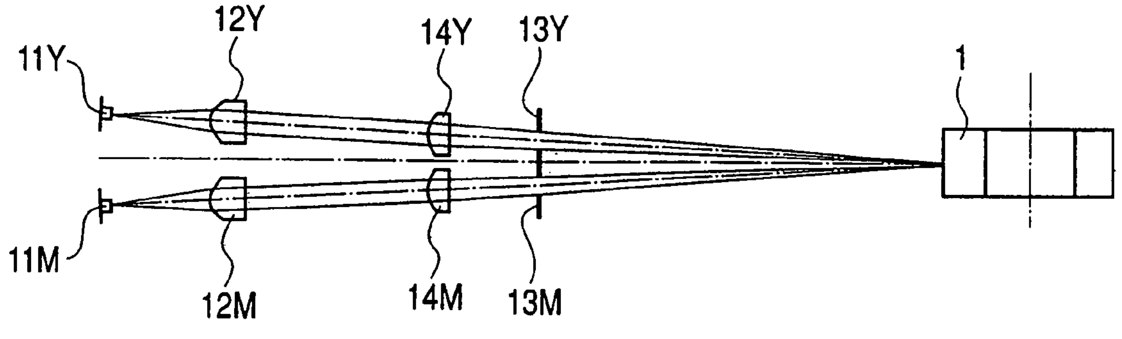

FIG. 3B is an explanatory view showing the incident optical system of the present invention. In FIG. 3B, the incident optical system includes light sources 11Y and 11M, collimator lenses 12Y and 12M, aperture stops 13Y and 13M, and cylindrical lenses 14Y and 14M. Note that, in a cyan station and a black station, the same optical systems are disposed symmetrical about the rotational axis of the polygon mirror 1.

In FIG. 3B, laser light beams emitted from the light sources 11Y and 11M are refracted by the collimator lenses 12Y and 12M to be incident as parallel light beams on the cylindrical lenses 14Y and 14M which have optical power in the sub scanning direction. After the light beams are condensed in the sub scanning direction by the cylindrical lenses 14Y and 14M and the widths of the light beams are regulated by the aperture stops 13Y and 13M, the light beams are incident on the deflection and reflection surface of the polygon mirror 1 at different incident angles +θ and −θ, respectively.

Figure 4:
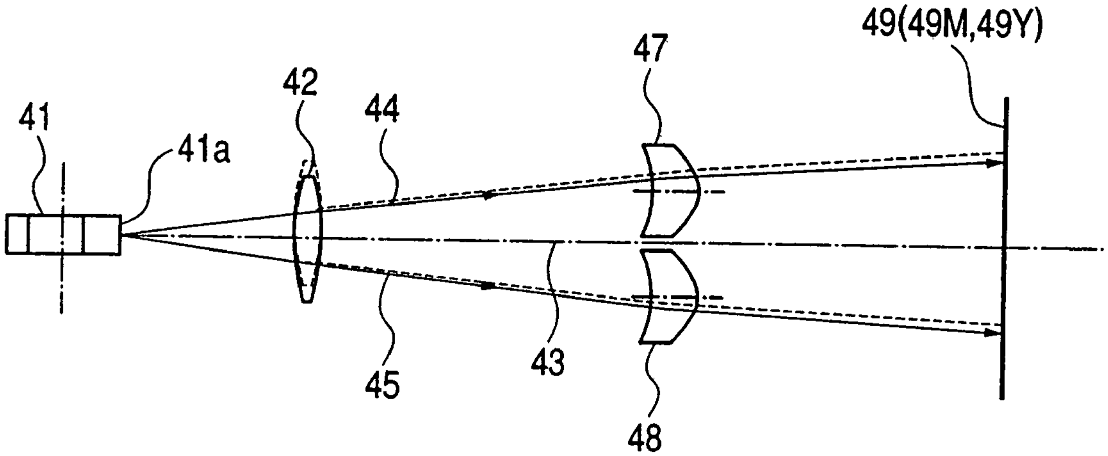
FIG. 4 is a sub scanning sectional view showing a conventional scanning optical system.

FIG. 4 is a sub scanning section showing a state of light beams near the deflection surface of the polygon mirror in the case where the present invention is not implemented.

In FIG. 4, reference numeral 41 denotes a polygon mirror, 42 denotes a first scanning lens, 43 denotes a normal of the deflection surface within the sub scanning section, 44 denotes first scanning light reflected on the deflection and reflection surface, 45 denotes second scanning light reflected on the deflection surface, 47 and 48 respectively denote scanning lenses, and 49 (49M and 49Y) denotes a surface to be scanned (surface of the photosensitive drum).

The first scanning lens 42 in FIG. 4 has convex surfaces on both surfaces and positive optical power within the sub scanning section. If the first scanning lens 42 is disposed eccentric upwardly with respect to the normal 43 due to a manufacturing error as shown by a broken line in FIG. 4, the first scanning light 44 is refracted and transmits through a position deviated from a designed position. Since the shift amount of light path changes according to an image height in the main scanning direction, the shift amount becomes larger when the image height in the main scanning direction increases.

Therefore, a light beam with a locus of more U-shaped than design standard is incident on the second scanning lens 47. As a result, a convex scanning line is formed on the'surface to be scanned 49. Similarly, since the second scanning light 45 is refracted and transmits through a position deviated from a designed position, a convex scanning line is formed on the surface to be scanned 49.

Figure 5:
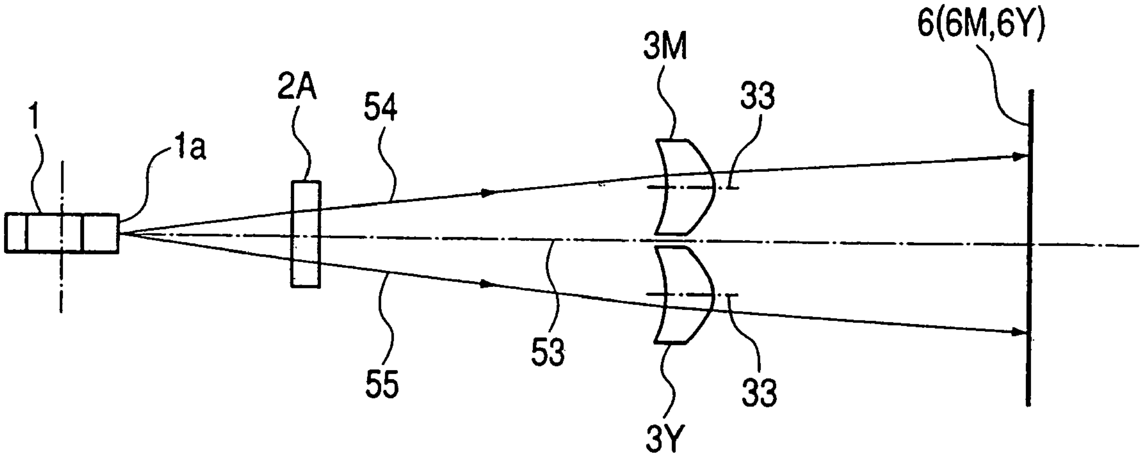
FIG. 5 is a sub scanning sectional view showing the scanning optical system according to the present invention.

FIG. 5 is a sub scanning section showing a state of light beams near the deflection surface of the polygon mirror in the case where the present invention is implemented. In FIG. 5, the same symbols are used for the same elements as those in FIG. 1.

In FIG. 5, reference numeral 53 denotes a normal of the deflection surface within the sub scanning section, 54 denotes first scanning light reflected on the deflection and reflection surface, 55 denotes second scanning light reflected on the deflection surface, and 33 denotes an optical axis of each of the second scanning lenses 3M and 3Y.

As shown in FIG. 5, both lens surfaces of the first scanning lens 2A within the sub scanning section have a large curvature radius (the same curvature radius). That is, the optical power of the first scanning lens 2A is substantially zero.

In other words, in this embodiment, when the optical power of the first scanning lens 2A within the sub scanning section is given by $\phi$1s, the first scanning lens 2A is configured so as to satisfy $$0 \leqq |\phi 1s| < 0.001 \quad (1)$$

In addition, in this embodiment, when the optical power of the first scanning lens 2A and the optical power of the second scanning lens (3M and 3Y) within the main scanning section are given $\phi$1m and $\phi$2m, respectively the following relation is satisfied.

$$|\phi 1m/\phi 2m| > 2.0 \quad (2)$$

The conditional expression (1) is to specify the optical power of the first scanning lens 2A within the sub scanning section. When the conditional expression (1) is not satisfied, the first scanning lens 2A has the optical power within the sub scanning section, so that the refraction amount in the sub scanning direction changes according to the rotational angle of the polygon mirror. This causes the curvature of the scanning line. Thus, when the position of the lens is deviated due to a lens arrangement error or the like, the scanning line occurs, which is not preferable because it is difficult to avoid the curvature of the scanning line due to the accuracy of manufacturing the optical scanning apparatus.

The conditional expression (2) relates to a ratio between the optical power of the first scanning lens 2A and the optical power of the second scanning lens within the main scanning section. When the conditional expression (2) is not satisfied, since the optical power of the second scanning lens within the main scanning section becomes larger, in order to obtain a preferable fθ characteristic, it is necessary to change the optical power within the main scanning section according to a field angle. Therefore, the shape of the second scanning lens within the main scanning section is liable to become undulate. The undulation of the lens shape causes an undulated scanning line when a lens arrangement error or the like occurs. When the curvature of the scanning line is corrected by another optical member, although a uniform curvature can be corrected, the undulation cannot be corrected.

It is more preferable that the above-mentioned conditional expressions (1) and (2) are set to $$0 \leqq |\phi 1s| < 0.0001 \quad (1a)$$

$$|\phi 1m/\phi 2m| > 4.0 \quad (2a)$$

In this embodiment, even when the first scanning lens 2A is deviated in the sub scanning direction due to a manufacturing error or the like, a position of the light beam within the sub scanning section hardly changes, so that states of light beams incident on the second scanning lenses 3M and 3Y do not change. Therefore, the curvature of the scanning light does not occur, so that it is possible to obtain an optical system insensitive to a deviation in the lens and the lens surfaces, which is a large factor for causing the curvature of the scanning line due to the manufacturing error. As a result, a color misregistration can be reduced.

Figure 6:
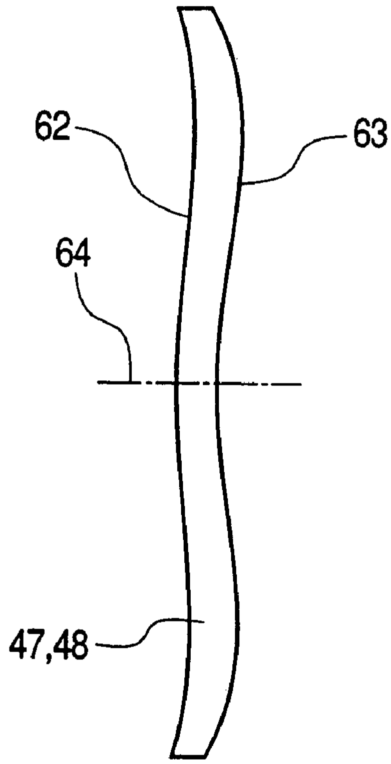
FIG. 6 is an explanatory view showing a main scanning sectional shape of a second lens of the conventional scanning optical system.

FIG. 6 is an explanatory view showing a shape of the second scanning lens (47, 48) within the main scanning section in the case where the present invention is not implemented.

In FIG. 6, reference numeral 62 denotes an incident side lens surface of the second scanning lens (47, 48), 63 denotes an exit side lens surface thereof, and 64 denotes an optical axis of the second scanning lens (47, 48) within the main scanning section.

When the above-mentioned conditional expressions (2) and (2a) are not satisfied, it is necessary to undulate the shape of the second scanning lens (47, 48) in order to correct the fθ characteristic of the scanning optical system.

Figure 7:
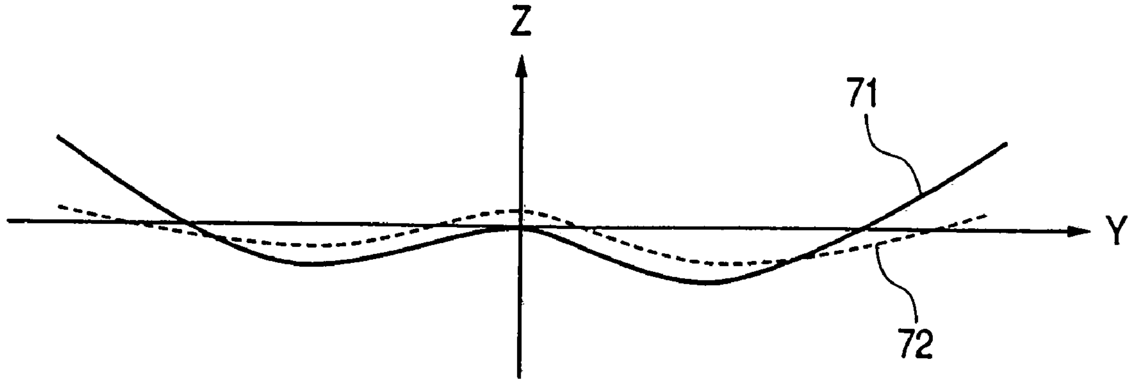
FIG. 7 is a graph showing a curvature of a scanning line in the conventional scanning optical system.

FIG. 7 shows a light beam reaching position of scanning light on the surface to be scanned in the case where the second scanning lens is deviated in the sub scanning direction due to a manufacturing error or the like. FIG. 7 is a graph showing a curvature of a scanning line which is caused by a conventional scanning optical system.

In FIG. 7, an abscissa Y indicates a drawing position (image height) and an ordinate Z indicates a light beam reaching position in the sub scanning direction. Reference numeral 71 demotes a line showing a scanning position within the sub scanning section in the case where the second scanning lens (47, 48) is obliquely disposed. As shown in the line 71, the scanning position within the sub scanning section changes in an undulated shape according to the drawing position. This results from the lens shape. Here, a line 72 indicates the corrected scanning line in the case where the curvature of the scanning line is adjusted as described later.

In general, when optical members other than the second scanning lenses 47 and 48 are deformed or displaced to adjust the curvature of the scanning line, the amount of correction to the scanning line exhibits a trajectory having no undulation. Therefore, even when the curvature of the scanning line is adjusted, the undulation of the scanning line is left as indicated by the line 72.

If the second scanning lens (47, 48) is tilted to adjust the curvature of the scanning line, the undulation component caused by the second scanning lens (47, 48) can be adjusted. However, since a curvature shape caused by the other reasons (for example, the nutation of the polygon mirror) is a shape having no undulation, as a result, the undulation component becomes larger so that a color deviation in a superimposed image increases.

Figure 8:
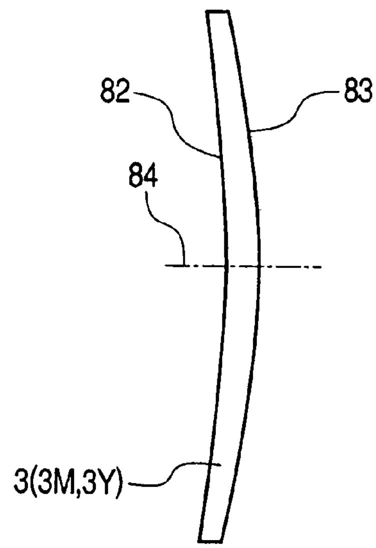
FIG. 8 is an explanatory view showing a main scanning sectional shape of a second lens according to embodiment 1 of the present invention.

FIG. 8 is an explanatory view showing a shape of the second scanning lens within the main scanning section in the case where the present invention is used.

In FIG. 8, reference numeral 3 (3M, 3Y) denotes the second scanning lens made of a plastic material as described above, 82 denotes an incident side surface of the second scanning lens 3 (3M, 3Y), 83 denotes an exit side surface thereof, and 84 denotes an optical axis of the second scanning lens 3 (3M, 3Y) within the main scanning section.

In this embodiment the incident side surface (light incident surface) 82 of the second scanning lens 3 becomes an R-plane shape (spherical shape) and the exit side surface (light exit surface) 83 thereof becomes an aspherical shape having no inflection point. In order that the shape of the lens surface within the main scanning section is set to a shape having only a small undulation as shown in FIG. 8, it is necessary to satisfy the above-mentioned conditional expression (2), and to correct the majority of fθ characteristic by the first scanning lens 2A.

Figure 9:
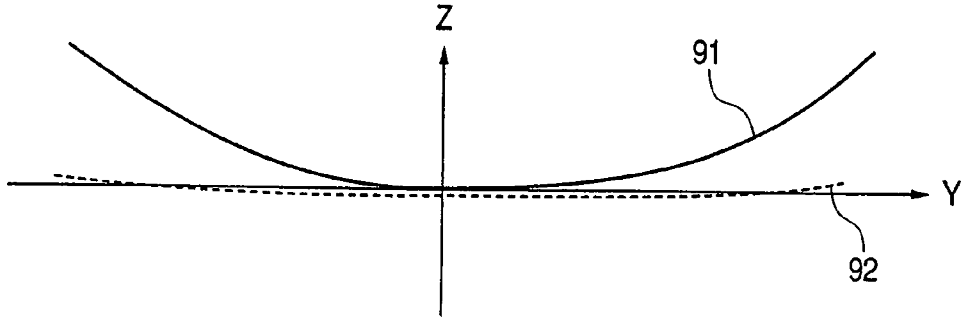
FIG. 9 is a graph showing a curvature of a scanning line in the scanning optical system according to embodiment 1 of the present invention.

FIG. 9 shows a state of the curvature of the scanning. FIG. 9 is a graph showing a curvature of a scanning line which is caused by the scanning optical system according to the embodiment.

In FIG. 9, an abscissa Y indicates a drawing position (image height) and an ordinate Z indicates a light beam reaching position in the sub scanning direction. Reference numeral 91 demotes a line showing a state of the curvature of the scanning line in the case where the second scanning lens 3 is tilted. As shown in FIG. 9, the trajectory of the scanning line exhibits a fairly simple shape having no undulation. A line 92 indicates the amount of correction in the case where the curvature of the scanning line is adjusted in the state. As shown in the line 92, the shape after the adjusting of the curvature of the scanning line becomes a shape having no undulation.

In this embodiment, the light incident surface of the second scanning lens 3 is set to the spherical shape and the light exit surface thereof is set to the aspherical shape. However, the present invention is not limited to such a case. For example, the light incident surface may be set to the aspherical shape and the light exit surface may be set to the spherical shape. Alternatively, both the light incident surface and the light exit surface may be formed in the spherical shape or the aspherical shape.

While absolute values of the incident angles ±θ on the deflection surface of the polygon mirror 1 are equal to each other and signs thereof are different from each other, angles θ1 and θ2 having different absolute values (such as $|\theta 1| \neq |\theta 2|$) may be set.

Figure 10:
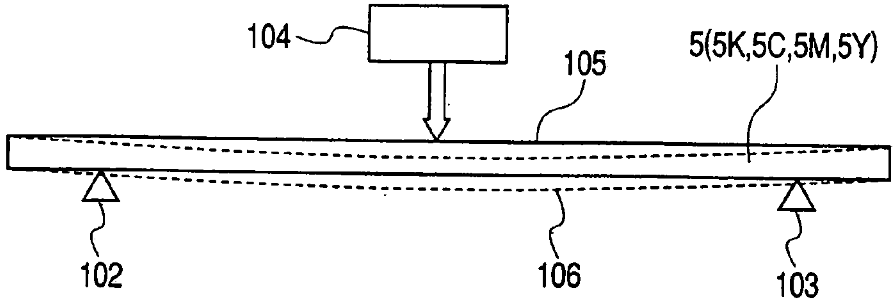
FIG. 10 is an explanatory view showing a corrected curvature of the scanning line in embodiment 1 of the present invention.

FIG. 10 is an explanatory view showing a method of adjusting the curvature of the scanning line in this embodiment.

The adjustment of the curvature of the scanning line in this embodiment is performed by making the return mirror 5 disposed on the optical path deformable (for example, bendable). That is, at least one of a plurality of return mirrors 5 (5K, 5C, 5M, and 5Y) in FIG. 1, is elastically deformed by an adjustment member 104 so that the curvature of the scanning line can be adjusted.

Referring to FIG. 10, reference numeral 5 (5K, 5C, 5M, 5Y) denotes the return mirror, 102 and 103 each denote a fixed point of the return mirror 5, 104 denotes the adjustment member (pressing member) for deforming the return mirror, 105 denotes a reflection surface of the return mirror, and 106 denotes a shape of the deformed return mirror.

As shown in FIG. 10, the return mirror 5 is pressed by the adjustment member 104 to be elastically deformed, thereby obtaining the shape 106 indicated by a broken line. Therefore, the reflection surface of the return mirror 5 becomes a convex shape. When the return mirror in such a state is used, it is possible to change the trajectory of the scanning line on the surface to be scanned, so that the curvature of the scanning line can be adjusted.

In this embodiment, the return mirror 5 can be deformed, whereas the present invention is not limited to this, for example, the return mirror 5 may be movable, or deformable and movable.

In this embodiment, as described above, the magnification of the scanning optical system within the sub scanning section is set to 1.3 or less, the second scanning lens 3 is disposed near the surface to be scanned, further a large air distance is set between the first scanning lens 2A and the second scanning lens 3, so that the scanning light is easily divided between the first scanning lens 2A and the second scanning lens 3. Thus, according to this embodiment, an optical path length can be made shorter than the case where an optical path is divided after the second scanning lens 3. It leads that the entire scanning optical system can be compactly produced.

NUMERICAL EXAMPLE 1

Hereinafter, numerical example 1 of the present invention will be described. Table 1 shows optical parameters in a BK station of the present invention as shown in FIG. 1.

Figure 11:
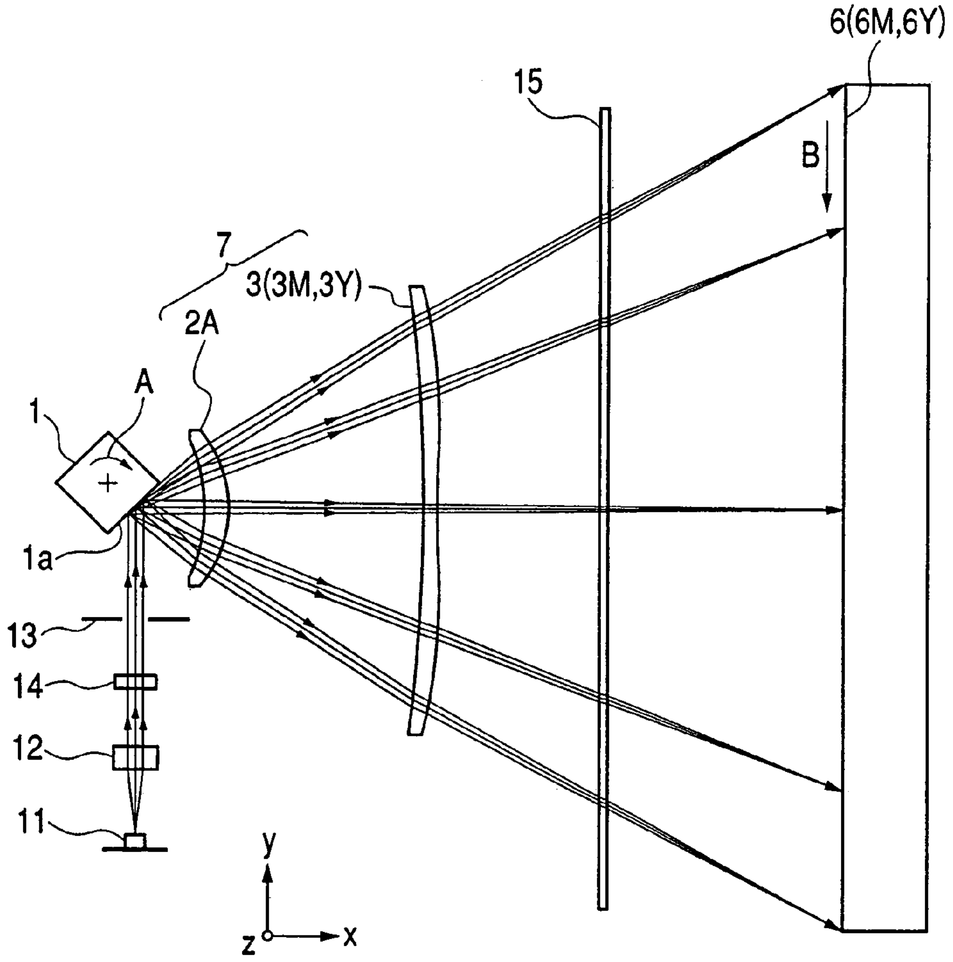
FIG. 11 is a main scanning sectional view showing an optical scanning apparatus according to numerical example 1 of the present invention.
Figure 12:
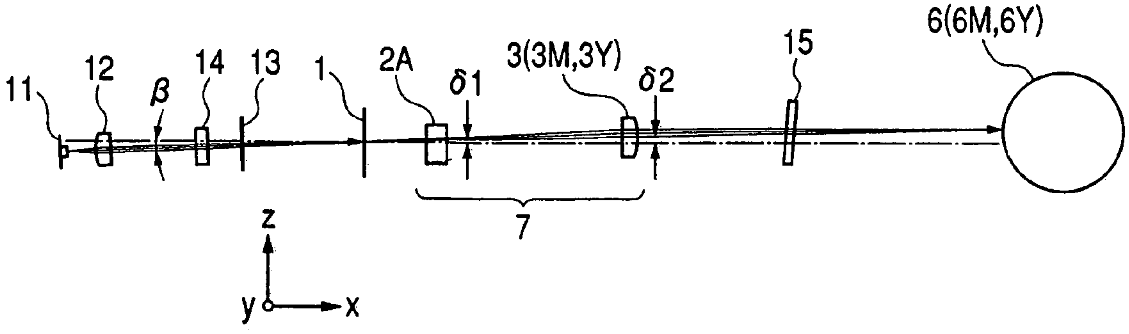
FIG. 12 is a sub scanning sectional view showing the optical scanning apparatus according to numerical example 1 of the present invention.

FIGS. 11 and 12 are respectively a main scanning sectional view and a sub scanning sectional view, showing an optical scanning apparatus according to numerical example 1. In FIGS. 11 and 12, the same symbols are used for the same elements as those in FIGS. 2 and 3. FIGS. 11 and 12 are used to describe a single station (BK station in FIG. 1). However, by applying the same optical system to the other stations (Y, M, and C), a scanning optical system for a color image forming apparatus which is compact and provides preferable performance can be realized. In other words, FIGS. 11 and 12 show only the BK station of the four stations shown in FIG. 1. The other three stations (Y, M, and C) are not shown in FIGS. 11 and 12. In numerical example 1, Table 1 shows the optical parameters only for the BK station shown in FIG. 1. Note that optical parameters are set for the other three stations (Y, M, and C) as well.

The shapes of refraction surfaces of the first scanning lens 2A and the second scanning lens 3 of numerical example 1 are represented by the following shape expression. That is, provided that: a point where the lens plane crosses the optical axis is set as the origin; an x axis represents an optical axis direction; a y axis represents an axis orthogonal to the optical axis in the main scanning section; and a z axis represents an axis orthogonal to the optical axis in the sub scanning section, a meridional direction corresponding to the main scanning direction is represented by the following expression:

$$x = \frac{y^2/R}{1+\sqrt{1-(1+K)(y/R)^2}} + B_4y^4 + B_6y^6 + B_8y^8 + B_{10}y^{10}$$

(where R represents a radius of curvature, and K, $B_4$, $B_6$, $B_8$, and $B_{10}$ each represent an aspherical coefficient), and the sagittal direction corresponding to the sub scanning direction (direction orthogonal to the main scanning direction including the optical axis) is represented by the following expression:

$$x = \frac{z^2/r'}{1+\sqrt{1-(1+K)(z/r')^2}}$$

$$r' = r(1 + D_2y^2 + D_4y^4 + D_6y^6 + D_8y^8 + D_{10}y^{10})$$

(where r' represents a sagittal radius of curvature on the optical axis, and $D_2$, $D_4$, $D_6$, $D_8$, and $D_{10}$ each represent an aspherical coefficient).

TABLE 1

| | |
|---|---|
| Wavelength used (mm) | 7.90E−07 |
| Refractive index of fθ lens | 1.524 |
| Incident angle in main scanning direction (deg.) | 90 |
| Incident angle in sub scanning direction (deg.) | 2.2 |
| Deflection point-G1R1 (mm) | 1.65E+01 |
| Focal length of fθ lens (mm) | 1.50E+02 |

| Type ST2 | R1 surface Scanning starting-side (s) | | R1 surface Scanning ending-side (e) | | R2 surface Scanning starting-side (s) | | R2 surface Scanning ending-side (e) | |
|---|---|---|---|---|---|---|---|---|
| Main scanning | d | | 6.00E+00 | | d | | 4.80E+01 | |
| | R | −3.62E+01 | | | R | −2.48E+01 | | |
| | K | −1.18E+00 | K | −1.18E+00 | K | −2.26E+00 | K | −2.26E+00 |
| | B4 | 5.67E−06 | B4 | 5.67E−06 | B4 | −1.05E−05 | B4 | −1.05E−05 |
| | B6 | 2.76E−08 | B6 | 2.76E−08 | B6 | 2.55E−08 | B6 | 2.55E−08 |
| | B8 | −1.31E−10 | B8 | −1.31E−10 | B8 | −1.84E−11 | B8 | −1.84E−11 |
| | B10 | 1.13E−13 | B10 | 1.13E−13 | B10 | −5.89E−14 | B10 | −5.89E−14 |
| Sub scanning | r | −1.00E+03 | r | | r | −1.00E+03 | R | |
| | D2 | 0.00E+00 | D2 | 0.00E+00 | D2 | 0.00E+00 | D2 | 0.00E+00 |
| | D4 | 0.00E+00 | D4 | 0.00E+00 | D4 | 0.00E+00 | D4 | 0.00E+00 |
| | D6 | 0.00E+00 | D6 | 0.00E+00 | D6 | 0.00E+00 | D6 | 0.00E+00 |
| | D8 | 0.00E+00 | D8 | 0.00E+00 | D8 | 0.00E+00 | D8 | 0.00E+00 |
| | D10 | 0.00E+00 | D10 | 0.00E+00 | D10 | 0.00E+00 | D10 | 0.00E+00 |

| Type ST2 | R3 surface Scanning starting-side (s) | | R3 surface Scanning ending-side (e) | | R4 surface Scanning starting-side (s) | | R4 surface Scanning ending-side (e) | |
|---|---|---|---|---|---|---|---|---|
| Main scanning | d | | 4.00E+00 | | d | | 9.95E+01 | |
| | R | −4.61E+02 | | | R | 8.36E+02 | | |
| | K | 0.00E+00 | K | 0.00E+00 | K | −3.58E+01 | K | −3.58E+01 |
| | B4 | 0.00E+00 | B4 | 0.00E+00 | B4 | −1.02E−06 | B4 | −1.02E−06 |
| | B6 | 0.00E+00 | B6 | 0.00E+00 | B6 | 2.09E−10 | B6 | 2.09E−10 |
| | B8 | 0.00E+00 | B8 | 0.00E+00 | B8 | −3.39E−14 | B8 | −3.39E−14 |
| | B10 | 0.00E+00 | B10 | 0.00E+00 | B10 | 2.68E−18 | B10 | 2.68E−18 |
| Sub scanning | r | −1.00E+03 | r | | r | −2.14E+01 | r | |
| | D2 | 0.00E+00 | D2 | 0.00E+00 | D2 | 1.81E−04 | D2 | 1.69E−04 |
| | D4 | 0.00E+00 | D4 | 0.00E+00 | D4 | −8.03E−08 | D4 | −6.92E−08 |
| | D6 | 0.00E+00 | D6 | 0.00E+00 | D6 | 3.07E−11 | D6 | 2.19E−11 |
| | D8 | 0.00E+00 | D8 | 0.00E+00 | D8 | −7.61E−15 | D8 | −4.14E−15 |
| | D10 | 0.00E+00 | D10 | 0.00E+00 | D10 | 8.89E−19 | D10 | 3.78E−19 |

Figure 13:
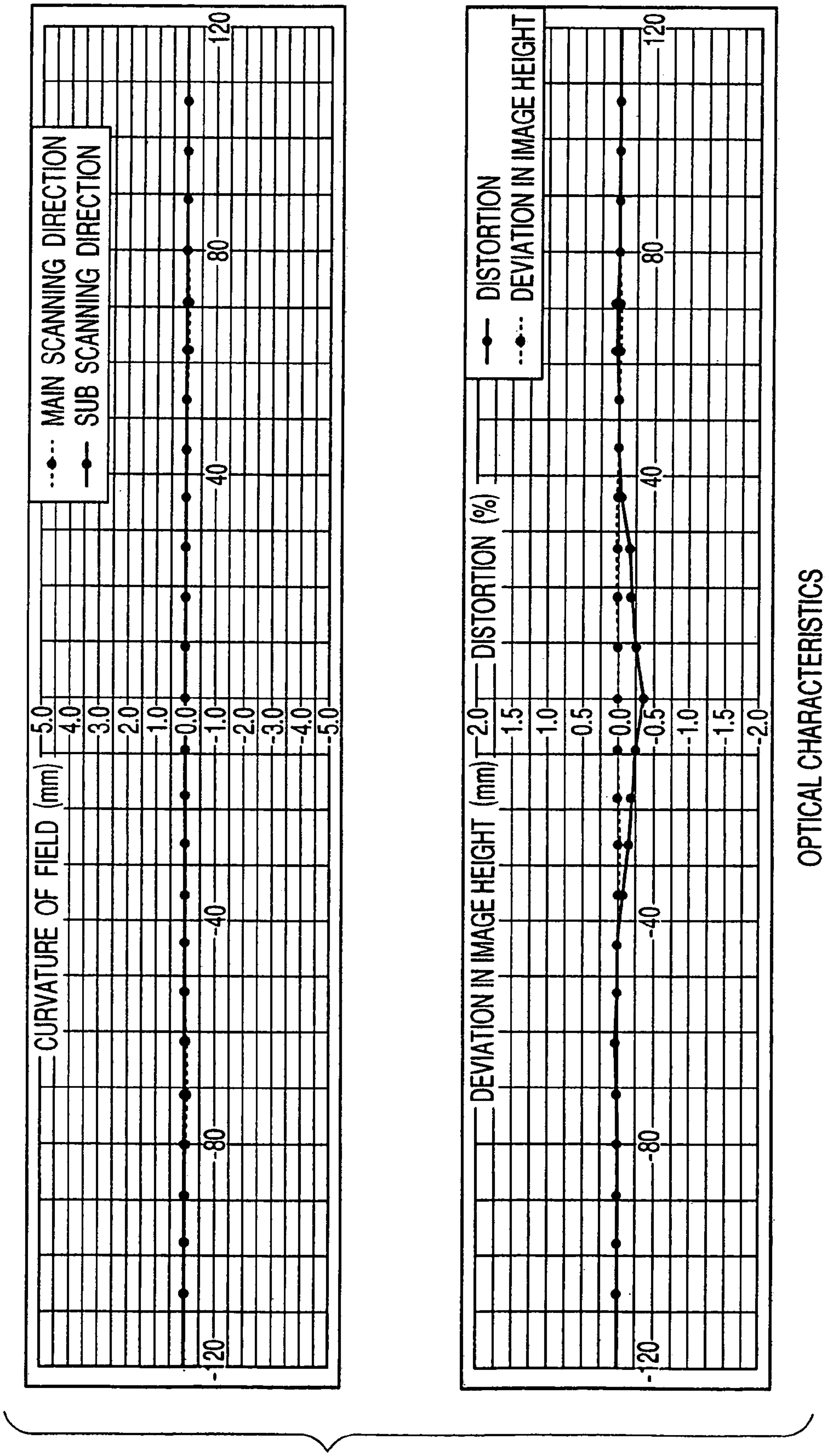
FIG. 13 is an explanatory graph showing optical performance according to numerical example 1 of the present invention.

In this embodiment, the beam is incident at an oblique incident angle of 2.2 degrees with respect to the normal of the deflection surface 1*a* of the polygon mirror 1 (oblique incident optical system). Also, in this case, the second scanning lens 3 has the optical axis at a position shifted by 1.46 (mm) in the z direction (sub scanning direction) with respect to the plane perpendicular to the deflection and reflection point. FIG. 13 shows a paraxial image plane position in this embodiment. As shown in FIG. 13, satisfactory optical performance can be attained in terms of the imaging performance and the image height deviation.

It is required that the uniformity of a sub scanning magnification of the scanning optical system is within 10%. In this numerical example, the uniformity is within ±1% in an effective scanning region, which causes virtually no problem for a scanning optical system of 600 dpi. By shifted the optical axis of the second scanning lens 3 by 1.3 (mm) toward the deflection and reflection point side with respect to the incident beam, the rotation of the beam is eliminated to obtain a preferable spot shape. In other words, the magnification of the scanning optical system in the sub scanning direction is kept constant in an effective image region.

The present invention provides a more remarkable effect with a resolution of 1200 dpi or more in which a high image quality is required.

At this time, the optical power of the first scanning lens 2A serving as the first optical element within the sub scanning section is $1.08\times10^{-6}$, and the optical power within the sub scanning section is substantially zero. This satisfies the above-mentioned conditional expressions (1) and (1a). An optical power ratio between the first scanning lens 2A and the second scanning lens 3 within the main scanning section is $|\phi 1m/\phi 2m|=4.45$, which satisfies the above-mentioned conditional expressions (2) and (2a).

In numerical example 1, the first scanning lens 2A mainly has the optical power within the main scanning section. A first surface (light incident surface) of the second scanning lens 3 within the main scanning section has a spherical shape. The second scanning lens 3 is made of a plastic material having weaker optical power off the scanning axis than that on the scanning axis within the sub scanning section. Therefore, the curvature of the scanning line due to the eccentricity of the first scanning lens 2A hardly occurs. In addition, the undulation of the scanning line due to the eccentricity of the second scanning lens 3 serving as the second optical element is very small. If the curvature of the scanning line is adjusted, the amount of curvature of the scanning line can be reduced to a very small amount.

The scanning optical system includes the second scanning lens 3, which is provided for each of a plurality of light beams and has optical power in the sub scanning direction. When the optical power of the first scanning lens 2A and the optical power of the second scanning lens 3 within the sub scanning section are given by $\phi$1s and $\phi$2s, respectively, it is preferable to satisfy $$|\phi 1s/\phi 2s|<0.1$$

Embodiment 2

Figure 14:
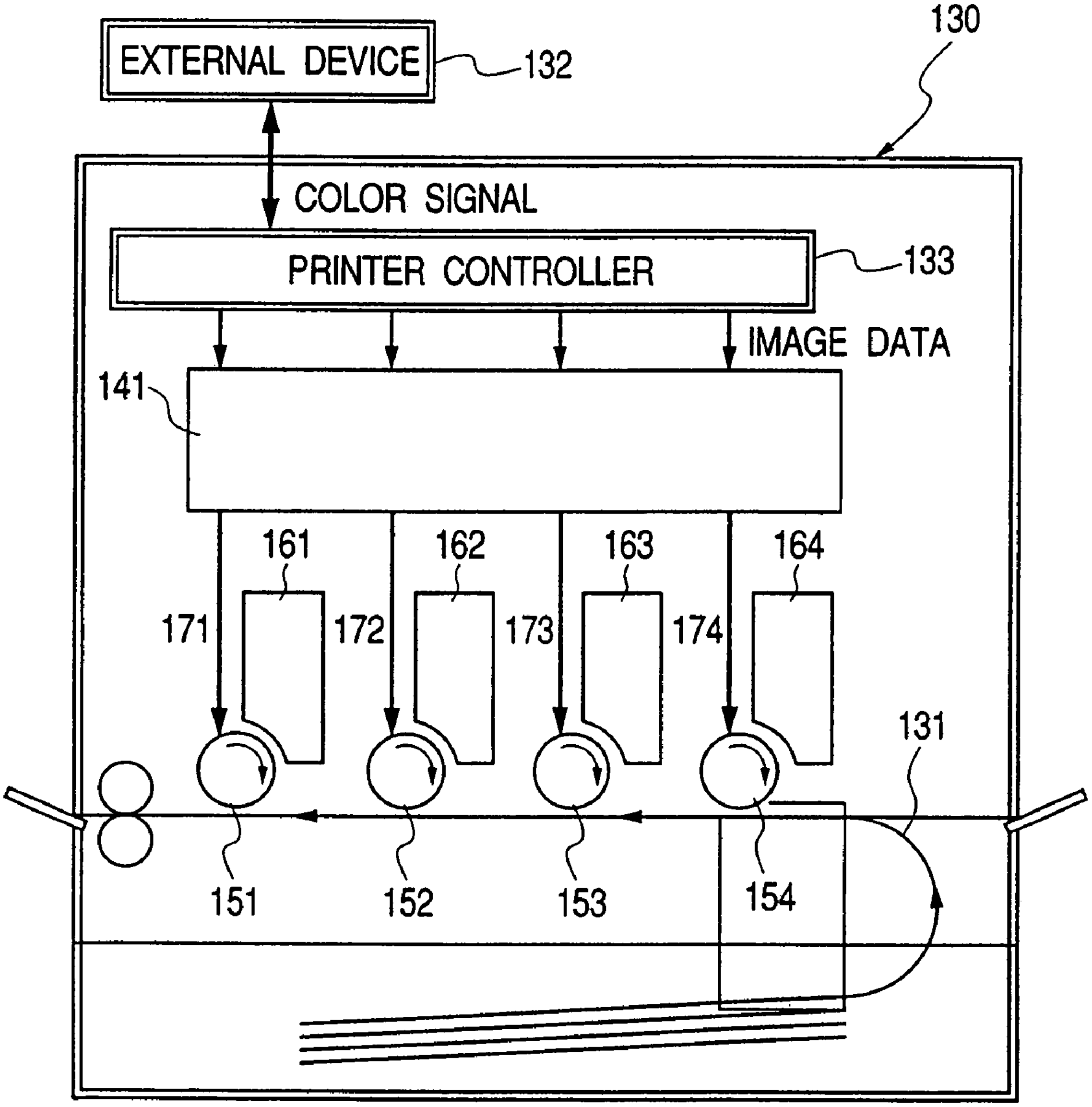
FIG. 14 is a sub scanning sectional view showing a color image forming apparatus according to embodiment 2 of the present invention.
Figure 15:
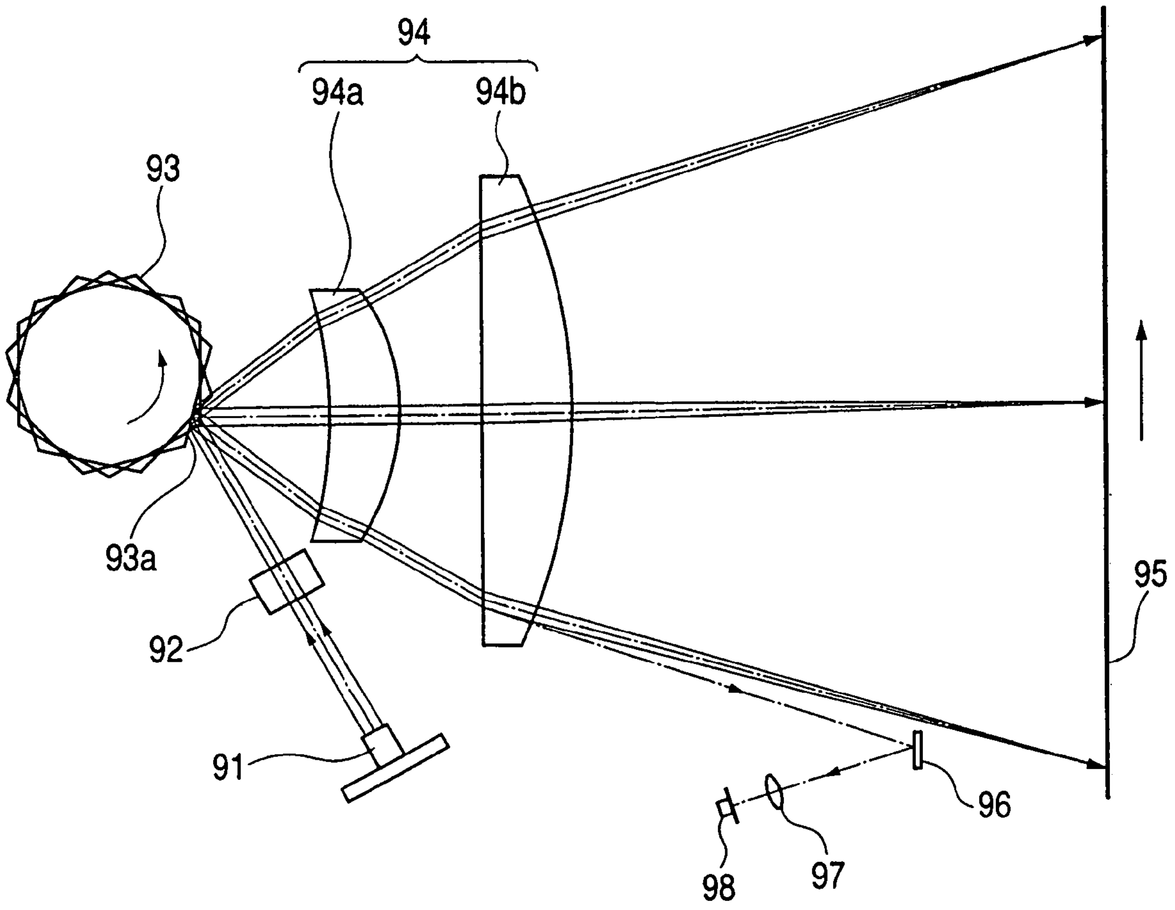
FIG. 15 is a main scanning sectional view showing an optical scanning apparatus used for a conventional image forming apparatus.

FIG. 14 is a schematic diagram showing a main part of a color image forming apparatus according to embodiment 2 of the present invention.

This embodiment corresponds to a tandem type color image forming apparatus in which the optical scanning apparatus according to embodiment 1 is used for scanning with four beams in parallel to one another to record image information on a photosensitive member as an image bearing member.

In FIG. 14, reference numeral 130 denotes a color image forming apparatus; and 141, an optical scanning apparatus having the configuration according to embodiment 1. Denoted by 151, 152, 153, and 154 are photosensitive drums as the image bearing member. Denoted by 161, 162, 163, and 164 are developing apparatus. Denoted by 131 is a conveyor belt.

In FIG. 14, the color image forming apparatus 130 receives'signals in respective colors of R (red), G (green), and B (blue) from an external apparatus 132 such as a personal computer. Those color signals are converted by a printer controller 133 within the apparatus into image data (dot data) in respective colors of C (cyan), M (magenta), Y (yellow), and B (black) to be inputted to the optical scanning. apparatus 141. Light beams 171, 172, 173, and 174 are emitted from the optical scanning apparatus 141 after being modulated according to the corresponding image data to scan photosensitive surfaces of the photosensitive drums 151, 152, 153, and 154 with the light beams in the main scanning direction.

The color image forming apparatus according to an embodiment of the present invention has the optical scanning apparatus 141 which conducts scanning with the four beams corresponding to the respective colors of C (cyan), M (magenta), Y (yellow), and B (black). The beams are used to record the image signals (image information) on the surfaces of the photosensitive drums 151, 152, 153, and 154, in parallel to one another, thereby printing the color image at a high speed.

The color image forming apparatus according to the embodiment of the present invention form latent images in respective colors on the corresponding surfaces of the photosensitive drums 151, 152, 153, and 154 with the beams based on the corresponding image data using the optical scanning apparatus 141 as described above. Thereafter, the latent images are multiply transferred onto the recording material to form a single full-color image.

The external device 132 may be a color image reading apparatus equipped with a CCD sensor, for instance. In this case, the color image reading apparatus and the color image forming apparatus 130 constitute a color digital copying machine.

According to the present invention, as described above, the optical power of the first optical element composing the scanning optical system within the sub scanning section is set to be substantially non-power. Thus, it is possible to realize a simple and compact optical scanning apparatus in which an optical deflector can be thinned and the curvature of the scanning line can be suppressed to obtain preferable optical performance, and an image forming apparatus using the optical scanning apparatus.

What is claimed is:

1. An optical scanning apparatus for scanning a plurality of surfaces to be scanned, comprising:

a plurality of light sources;

an optical deflector for deflecting and reflecting a plurality of light beams emitted from the plurality of light sources; and an imaging optical system for guiding the plurality of light beams which are deflected and reflected by the optical deflector to the different surfaces to be scanned, wherein:

the plurality of light beams incident on the optical deflector are incident on a deflection surface of the optical deflector at different angles to a normal of the deflection surface within a sub scanning section;

the imagining optical system comprises a first optical element and a plurality of second optical elements;

the first optical element is commonly used for the plurality of light beams;

optical power of the first optical element satisfies $0 \leqq |\phi 1s| < 0.001$ where $\phi$1s represents optical power of the first optical element within the sub scanning section;

a second optical element is provided for each of the plurality of light beams and each of the plurality of second optical elements has optical power in a sub scanning direction;

optical power of the first optical element and optical power of each of the plurality of second optical elements within the sub scanning section are represented by $\phi$1s and $\phi$2s, respectively, and $$|\phi 1s/\phi 2s|>0.1$$

is satisfied; and an optical axis of each second optical element within the sub scanning section is eccentric in parallel to a deflection and reflection point side with respect to a principal ray position of a light beam incident on such second optical element within the sub scanning section; and a principal ray of a light beam is incident on each second optical element at an angle to an optical axis of such second optical element within the sub scanning section.

2. An optical scanning apparatus according to claim 1, wherein the imaging optical system has a constant magnification in the sub scanning direction within an effective image region.

3. An image forming apparatus, comprising:

a plurality of image bearing members in which images in colors different from one another are formed, each of which is disposed on a surface to be scanned in the optical scanning apparatus according to claim 1.

4. An image forming apparatus according to claim 3, further comprising a printer controller that converts a color signal inputted from an external apparatus into image data in different colors and outputs the image data to each of the optical scanning apparatus.

5. An image forming apparatus, comprising a plurality of optical scanning apparatuscs according to claim 1, wherein the plurality of optical scanning apparatuses are disposed with said optical deficctor sandwiched therebetween in the sub scanning section.

* * * * *

UNITED STATES PATENT AND TRADEMARK OFFICE

CERTIFICATE OF CORRECTION

PATENT NO. : 7,224,503 B2
APPLICATION NO. : 11/263910
DATED : May 29, 2007
INVENTOR(S) : Hidemi Takayama It is certified that error appears in the above-identified patent and that said Letters Patent is hereby corrected as shown below:

COLUMN 9
Line 43, "normal 33" should read --normal 31; and
Line 47, "normal 33" should read --normal 31--.

COLUMN 10
Line 50, "the'surface" should read --the surface--.

COLUMN 11
Line 13, "given" should read --given by--.

COLUMN 12
Line 18, "demotes" should read --denotes--;
Line 39, "nutation" should read --mutation--; and
Line 64, "scanning." should read --scanning line.--.

COLUMN 17
Line 35, "receives'signals" should read --receives signals--.

COLUMN 18
Line 30, "imagining" should read --imaging--.

UNITED STATES PATENT AND TRADEMARK OFFICE

CERTIFICATE OF CORRECTION

PATENT NO. : 7,224,503 B2
APPLICATION NO. : 11/263910
DATED : May 29, 2007
INVENTOR(S) : Hidemi Takayama It is certified that error appears in the above-identified patent and that said Letters Patent is hereby corrected as shown below:

COLUMN 19

Line 5, "apparatuscs" should read --apparatuses--.

COLUMN 20

Line 2, "deficctor" should read --deflector--.

Signed and Sealed this

First Day of April, 2008

JON W. DUDAS
*Director of the United States Patent and Trademark Office*